July 11, 1950     E. H. MUELLER     2,514,506
VALVE FOR FUEL GAS
Filed May 4, 1948
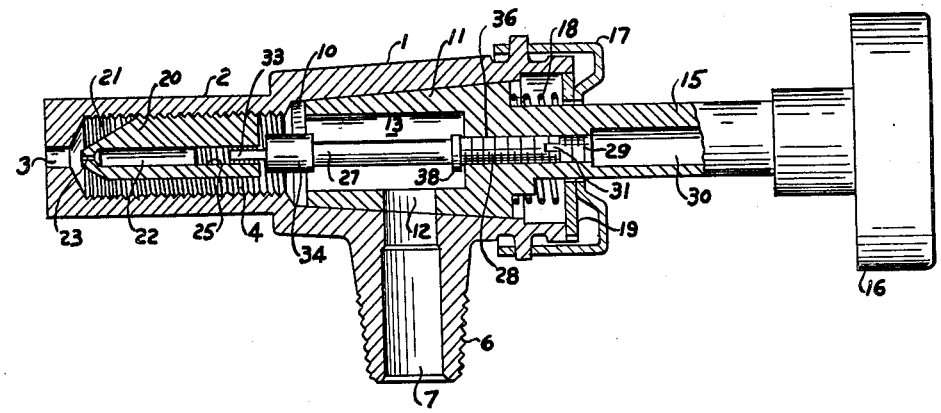
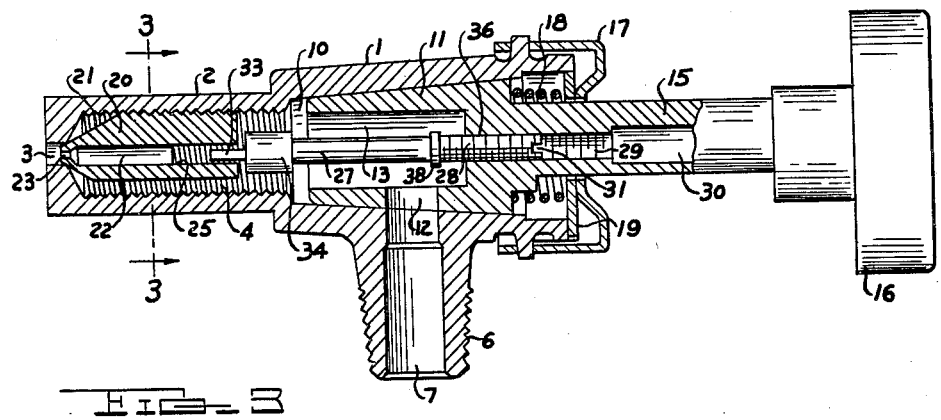
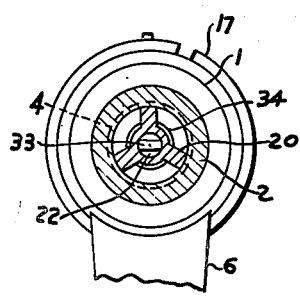
INVENTOR.
ERVIN H. MUELLER.
BY
ATTORNEYS.

Patented July 11, 1950

2,514,506

UNITED STATES PATENT OFFICE 2,514,506

VALVE FOR FUEL GAS

Ervin H. Mueller, Grosse Pointe, Mich.

Application May 4, 1948, Serial No. 25,024

2 Claims. (Cl. 158—120)

This invention relates to a valve for controlling different types of fuel gas.

From a general standpoint, there are two major classifications of fuel gas. One class includes natural gas and manufactured gas, of which there are several varieties, and mixtures thereof. The other general class is the so-called bottled gases usually referred to as liquid petroleum gases, such as propane and butane. A controlling valve designed and manufactured for use with one class of gas is not satisfactory for use with the other.

When a manufacturer of gas ranges, for example, is assembling the ranges of other gas burning equipment, it is usually not known where the article will ultimately be used, nor with what kind of fuel gas it will be employed. Accordingly, if the range is equipped with valves of a type for handling fuel gas of one class, the valves will be unsatisfactory for fuel gas of the other class. The ordinary fuel gases, such as manufactured or natural gases, vary in different localities throughout the country, but the ordinary valve made for such gases may be adjusted to take care of such variations. But if the range happens to be put into use by a purchaser with bottled gas, an unsatisfactory operation is obtained. The same thing would be true if a range equipped with valves for bottled gas be installed for use with natural or manufactured gas.

Accordingly, it is not feasible to select the proper valve at the time of manufacture. And it is a difficult and annoying procedure to have to change the valves after the piece of equipment has been shipped and perhaps sold.

The principal object of this invention is to provide a valve construction which can be used with any one of the gases above mentioned. The valve is so constructed and arranged as to provide for election of the outlet orifice of the valve which election may be carried out by a simple and expedient adjustment which can be made through the stem of of the valve. Thus, if the range or other piece of equipment is so constructed that the valve or valves thereon are pretty well concealed or covered by exterior metal work they can nevertheless be easily and quickly adjusted for the gas to be used therewith by access to the orifice controlling parts through the operating stem.

A valve made in accordance with the invention is disclosed in the accompanying drawings:

Fig. 1 is a cross sectional view of a valve adjusted to provide an orifice for a natural or manufactured gas or mixtures thereof.

Fig. 2 is a view similar to Fig. 1 showing the orifice adjusted for use with bottled gas.

Fig. 3 is a cross sectional view taken substantially on line 3—3 of Fig. 1.

The valve, as shown in the drawings, has a body 1 and it happens to be shown as having an integral outlet extension 2 with an outlet orifice 3. The outlet extension is internally threaded as at 4.

The valve body has a threaded extension 6, which provides an inlet passageway 7 leading to an internally tapered chamber 10 in which is seated a tapered valve member 11. This valve member has an inlet port 12 connecting into passage 13 in the valve member and which opens into the outlet passage. The valve member 11 is turnable in its seat by an operating stem 15 to which a suitable handle 16 may be applied.

The body is closed by a cap 17 suitably attached to the body and through which the stem extends. A coiled spring 18 lies within the cap and serves to hold the valve member on its seat with the spring reacting against the cap. A washer 19 may be disposed between the spring and the cap. Various washer and cap arrangements may be employed insofar as the invention is concerned.

Mounted in the outlet extension is an orifice control member 20 which is mounted on the screw threads 4 and which has a pointed or needle-like end 21 for cooperation with the outlet orifice 3. This member 20 has a passage 22 therethrough and a small orifice 23 which passes through the pointed end at the point of the needle.

The member 22 is adjustable on its threads and for this purpose it is provided with a slot 25 to be engaged by an operating member. Such a member is illustrated as having a stem portion 27 with one end part as shown at 28 provided with threads so that it may be mounted in a threaded bore 29 in the stem. The stem is hollow, as shown at 30 and the bore 29 extends through the valve member from the hollow of the stem to the passage 13. The end of the operating member is fashioned to receive a suitable tool so that it may be turned, such for example, as a slot 31 for receiving a screw driver. The end of the operating member opposite the screw threaded part 28 has a blade-like extension 33 adapted to fit in the slot 25 and between the blade 33 and the intermediate stem part 27 the member may have an enlarged part 34. This enlarged part provides an adequate diameter to give an adequate width to the blade 33. The threads on the portion 28 are illustrated at 36 and it will be noted that the threads extend from the end thereof but terminate short of the intersection between the threaded part 28 and the stem part 27 thus leaving a shoulder 38 which will not pass through the bore 29.

In making the assembly, the control member must be threaded into the bore 29 by passing it through the passage 13 because the head 38 will not pass through the bore 29. This can be done before the valve member is placed in the valve body. When the valve member is placed in its chamber, the blade part 33 is positioned in the slot 25 of the orifice control member.

For use with what may be called common city gas, which may be natural gas or any one of different types of manufactured gas, or mixtures of natural or manufactured gas, the orifice control member is adjusted to a position as indicated in Fig. 1. When the valve member is turned so that the inlet port 12 registers with the inlet passage 7, the gas flows through the passage 13 through the outlet extension and is discharged in the form of a stream or jet from the orifice 3. It will be noted that the gas may flow through the passage 22 and through the small orifice 23 and can also flow around the orifice control member 20 due to the shape of the member 20, as shown in Fig. 3. The correct or desired jet of gas may be obtained by adjusting the orifice control member 20, which is done by passing a screw driver into a hollow stem and turning the operating member. This causes the orifice control member 20 to rotate because of the engagement of the blade 23 with the slot 25 so that the orifice control member 20 is shifted on its screw threads toward and away from the orifice 3. Adjustment may be made to meet local conditions as to the type and pressure of the manufactured or natural gas encountered.

In this connection, it will be noted that the operating member 27 cannot be entirely removed through the stem. If the operating member be retracted as far as it will go, the shoulder 38 seats on the metal surrounding the bore 29. Thus, an unskilled person cannot cause disassembly of the parts. The arrangement is such, of course, that when the shoulder 38 does thus seat, the orifice control member 20 is retracted from the orifice 3 for as any normal condition requires.

If the valve is to be used with bottled gas the operating member is manipulated to rotate the orifice control member until the pointed end 21 seats in the orifice 3 and closes it. This, then, leaves the small orifice 23 for the issuance therefrom of the liquid petroleum gas. The outlet orifice for such a gas must be relatively small because, for one thing, of the pressure under which such gas is maintained.

Accordingly, it will be seen how the valve may, with ease and facility, be adjusted for use with a form of so-called city gas or for use with liquid petroleum gas normally referred to as bottled gas. Furthermore, it will be noted how the valve may be adjusted to meet varying conditions of manufactured or natural gas. This is all attained easily by access through the hollow stem and yet the parts can, at no time, be disassembled by an improper retraction of the operating member.

I claim:

1. A valve for controlling the supply of different types of gaseous fuel to a burner comprising, a valve body, a valve member turnable in the body, said body having an inlet passage and having a hollow extension disposed substantially axially of the valve member and providing an outlet passage, the valve member having a passage for connecting the said inlet and outlet passages, said extension having an axially positioned outlet orifice and said extension being internally threaded, an orifice control member mounted on the threads in the hollow extension and constructed so that gas may pass around the same, said orifice control member having a pointed end for throttling and closing the said outlet orifice, said orifice control member having a passage therethrough including a relatively small outlet orifice at its pointed end, a hollow operating stem for the valve member, the valve member having an axially disposed internally threaded bore connecting the hollow of the stem and the said passage in the valve member, an operating member mounted in the said threaded bore and accessible for turning through the hollow stem and having a slidable and non-rotatable connection with the orifice control member and an enlargement on the operating member located in the passage of the valve member arranged to abut the end wall of the said passage in the valve member to limit withdrawal movement of the operating member.

2. A valve for controlling the supply of different types of gaseous fuel to a burner comprising, a valve body, a valve member turnable in the body, said body having an inlet passage and having a hollow extension disposed substantially axially of the valve member and providing an outlet passage, the valve member having a passage for connecting the said inlet and outlet passages, said extension having an axially positioned outlet orifice and said extension being internally threaded, an orifice control member mounted on the threads in the hollow extension and constructed so that gas may pass around the same, said orifice control member having a pointed end for throttling and closing the said outlet orifice, said orifice control member having a passage therethrough including a relatively small outlet orifice at its pointed end, a hollow operating stem for the valve member, the valve member having an axially disposed internally threaded bore connecting the hollow of the stem and the said passage in the valve member, and an enlargement on the operating member located in the said passage in the valve member to limit the withdrawal movement of the operating member, an operating member having a part threaded in the axial bore, said operating member having a part extending through the passage in the valve member, the operating member and the orifice control member having parts interengaging each other slidably and non-rotatably, the operating member being accessible for turning through the hollow stem so that the orifice control member may be turned and axially adjusted on its threads, the control member adapted to open the outlet orifice in the extension for gas of one type and adapted to close the outlet orifice in the extension so that gas of another type flows only through the relatively small outlet orifice in the orifice control member.

ERVIN H. MUELLER.

REFERENCES CITED

The following references are of record in the file of this patent:

UNITED STATES PATENTS

| Number | Name | Date |
| --- | --- | --- |
| 576,682 | Levy | Feb. 9, 1897 |
| 1,482,798 | Kenney | Feb. 5, 1924 |
| 1,536,630 | Reineche | May 5, 1925 |
| 1,759,892 | Doen | May 27, 1930 |
| 2,260,474 | Mueller | Oct. 28, 1941 |

FOREIGN PATENTS

| Number | Country | Date |
| --- | --- | --- |
| 29,624 of 1910 | Great Britain | Dec. 21, 1910 |
| 102,357 | Australia | Nov. 12, 1936 |